United States Patent

Demiryont et al.

Patent Number: 5,358,669
Date of Patent: Oct. 25, 1994

[54] PLASTIC COMPOSITE GLAZINGS

[75] Inventors: Hulya Demiryont, Farmington Hills; Ralph T. Nichols, Romulus, both of Mich.

[73] Assignee: Ford Motor Company, Dearborn, Mich.

[21] Appl. No.: 868,932

[22] Filed: Apr. 16, 1992

Related U.S. Application Data

[62] Division of Ser. No. 736,839, Jul. 29, 1991, abandoned.

[51] Int. Cl.$^5$ .............................. F21V 9/04; B32B 5/16
[52] U.S. Cl. .................................... 252/587; 428/323; 428/328
[58] Field of Search ................ 252/582, 587; 428/323, 428/328

[56] References Cited

U.S. PATENT DOCUMENTS

| | | | |
|---|---|---|---|
| 3,876,552 | 4/1975 | Moynihan | 428/323 |
| 3,958,062 | 5/1976 | Moynihan | 428/328 |
| 3,988,494 | 10/1976 | McAdow | 428/328 |
| 4,097,639 | 6/1978 | Millar | 428/328 |
| 4,533,591 | 8/1985 | Soko-Ram | 428/328 |
| 4,544,600 | 10/1985 | Kern | 428/323 |
| 4,571,361 | 2/1986 | Kawaguchi | 428/328 |
| 4,851,081 | 7/1989 | Forschirm | 156/668 |
| 4,895,904 | 1/1990 | Allingham | 523/135 |
| 4,921,775 | 5/1990 | Carroll, Jr. et al. | 428/328 |
| 5,085,931 | 2/1992 | Boyer, III et al. | 428/328 |
| 5,215,820 | 6/1993 | Hosokawa et al. | 428/328 |

FOREIGN PATENT DOCUMENTS 2631586  1/1978  Fed. Rep. of Germany.

*Primary Examiner*—Philip Tucker
*Attorney, Agent, or Firm*—Lorraine S. Melotik; Roger L. May

[57] ABSTRACT

A solar control plastic glazing, comprising a plastic matrix having a plurality of metal particles homogeneously dispersed therein, is prepared by depositing a thin metal film onto the surface of a plastic sheet, heating the plastic sheet above its "softening temperature, deforming the sheet to cause the metal film to disintegrate into metal particles, and mixing the metal particles and plastic to form a composite.

8 Claims, No Drawings

PLASTIC COMPOSITE GLAZINGS

This is a division of application Ser. No. 07/736,839, filed Jul. 29, 1991.

FIELD OF THE INVENTION

The present invention relates generally to plastic composite glazings. More particularly, the invention concerns automotive and architectural glazings and glazing systems employing a plastic composite, comprising a plastic matrix material having metal particles dispersed therein.

BACKGROUND OF THE INVENTION

It is generally known that high optical quality, transparent plastic sheets having enhanced solar control properties may be used alone or in combination with other materials, e.g., glass, to prepare solar load reducing automotive and architectural glazings. A particularly useful combination comprises well-known asymmetrical laminated glazings, wherein a plastic sheet having enhanced solar control properties is laminated to a monolithic or multi-layered glass and/or plastic support. Such a combination would impart weight reduction and safety properties to an automotive or architectural glazing, in comparison to the all-glass construction of conventional glazings.

Enhanced solar control glazings are currently used in several areas where one objective is to manage internal heat loads, by reflecting a portion of the solar spectrum which causes heating (i.e., infrared radiation) while maximizing transmission of the visible light portion of the solar spectrum. Such technology has been employed, for example, in commercial and residential glazings, and more recently in automotive glazings.

It is also known that the solar control properties of glazings may be enhanced by conventional coating techniques such as, for example, vacuum deposition or plasma-enhanced chemical vapor deposition, wherein metal or dielectric films are placed on the surface of the glazing. For example, transparent dielectric layers of fluorine-doped tin oxide or indium oxide, or very thin noble metal films of gold, silver, copper, and the like, or multi-layered structures comprising these dielectrics and metal films, may be deposited on plastic glazings by such methods. However, it is difficult to prepare metal or dielectric coatings which are uniform across the surface of the glazing by the aforesaid conventional deposition techniques. Due to the difficulties of maintaining uniform consistency, delivery, and distribution of the reactive precursors which form the desired coating at the surface of the glazing substrate, the ultimately produced metal and/or dielectric layer or layers generally exhibit a visually mottled appearance and iridescent patterns.

A publication by R. H. Doremus entitled "Optical Properties of Small Gold Particles", "Journal of Chemical Physics," 40, 2389 (1964), discloses the homogeneous incorporation of gold particles into glass to provide infrared energy reflection while maintaining visible light transmittance. The disclosed method for producing the uniform, homogeneous distribution of gold particles involves adding a gold chloride salt and ceric oxide nucleating agent to a soda-alumina-silica glass melt, irradiating the formed glass with ultraviolet energy, and thereafter heating the glass to a temperature from 400° C. to 630° C. to cause the gold particles to grow homogeneously throughout the glass matrix. Such a structure does not exhibit a mottled appearance or iridescent pattern, as does a glass substrate coated with a thin gold film by the conventional deposition techniques disclosed hereinabove. However, the disclosed structure, having the gold particles dispersed therein, does display infrared reflectance and visible light transmittance comparable to a glass substrate having an adhered gold film. Clearly, the disclosed technique can not be used to form gold particles within a plastic substrate.

It would be desirable to prepare a plastic having uniform infrared reflectance and visual light transmittance, which could be used alone or in association with other transparent materials, to produce enhanced solar control automotive and architectural glazings free from mottling and iridescent patterns.

SUMMARY OF THE INVENTION

Accordant with the present invention, a plastic composite which reflects infrared energy and transmits visible light has surprisingly been discovered. The composite comprises:
A) a plastic matrix; and
B) a plurality of metal particles homogeneously dispersed therein.

Moreover, a unique process for preparing such a composite has surpisingly been discovered. The process comprises the steps of:
A) depositing a metal film on a surface of a plastic sheet;
B) heating the plastic and metal film thereon to a temperature above the plastic set temperature; and
C) deforming the plastic to cause the metal film to disintegrate into metal particles, and mixing the plastic and metal particles to form a plastic matrix having a plurality of the metal particles homogeneously dispersed therein.

The efficiency with which the composite reflects infrared energy and transmits visible light depends, inter alia, upon the average mean particle size and concentration of the metal particles and the optical properties (e.g., color) of the plastic matrix.

The composite may be used monolithically as a glazing material, or may be used in combination with other substantially transparent materials (e.g., glass) to produce automotive or architectural glazings.

DETAILED DESCRIPTION OF THE PREFERRED EMBODIMENT

The present invention is directed to a plastic composite comprising a plastic matrix and a plurality of metal particles dispersed therein, and methods of producing same. The inventive composite reflects infrared energy and transmits visible light, and therefore, is useful for preparing solar load control automotive and architectural glazings.

Plastics useful for preparing the composites of the present invention include, but are not necessarily limited to, polycarbonates, polyesters, acrylics, polyetherimides, polyetherketones, styrenics, polymethacrylates, polyurethanes, polyethylene, polyvinyl butyral, and the like, as well as copolymers and blends thereof.

Metals which have the same utility and operability according to the present invention include, but are not necessarily limited to, gold, siler, copper, iron, nickel, aluminum, chromium, molybdenum, and the like, as well as mixtures and alloys thereof.

The composites of the present invention comprise a plastic matrix having a plurality of metal particles dispersed therein. The composites may be in the form of a sheet suitable for use as a glazing or glazing system component for automotive or architectural use. The metal particles are effective for reflecting infrared energy from the glazing, but are of a size and concentration sufficient to allow the transmission of a substantial amount of visible light through the glazing.

The metal particles of the inventive composite range in average mean particle size from about 2 Angstroms to about 2,000 Angstroms. Preferably, the range is from about 5 Angstroms to about 1,000 Angstroms. Likewise, the concentration of metal particles may vary from about 10 per cubic millemeter to about 2,200 per cubic millemeter. Preferably, the concentration of metal particles is from about 20 per cubic millemeter to about 1,500 per cubic millemeter.

The composites may be formed into sheets, to be used monolithically as solar control glazings, or may be used in combination with the other generally transparent materials known to be useful for fabricating automotive or architectural glazings. For example, the composites of he present invention may be laminated by conventional methods to glass sheets, to prepare so-called asymmetrical laminated solar control glazings, wherein the composite is adhered to a singular sheet of glass; or the inventive composites may be laminated intermediate two glass sheets to prepare solar control safety glazings, wherein the composite is adhered to apposing surfaces of two glass sheets. Alternatively, the composites of the present invention may be used as a lamina or as laminae in a multi-layered or multi-component glazing laminate or glazing system, employing one or more glass and/or plastic sheets.

The solar control properties, i.e., the amount of infrared energy reflected, the quantity of visible light transmitted, the transmitted and reflected colors, the shading coefficient, etc., are dependent on several factors such as the average mean particle size, composition, and concentration of the metal particles, the optical properties and color of the plastic matrix, the thickness of the composite, etc. Generally, greater concentrations of metal particles result in greater infrared reflection, and larger average mean particle sizes result in reduced visible light transmittance.

The composites of the present invention furthermore may contain conventional thermoplastic polymer adjuvants such as, for example, thermal stabilizers, dyes, pigments, plasticisers, ultraviolet radiation absorbers, and the like, in conventional amounts generally not exceeding about 20% of the total weight of the composite. Moreover, the inventive composites may be coated with materials such as silicon dioxide, silicon nitride, silicon carbide, titanium dioxide, tantalum oxide, etc., which are known in the art as useful for providing enhanced physical and/or optical properties such as abrasion resistance or anti-reflectivity.

The present invention also contemplates a process for preparing the inventive composite. A thin film of the metal described hereinabove is deposited into a sheet of one of the plastics described hereinabove, by any conventional deposition technique such as, for example, vacuum deposition or plasma-enhanced chemical vapor deposition. These and other suitable metal deposition processes are more fully set forth in Kirk-Othmer, *Concise Encyclopedia of Chemical Technology*, John Wiley & Sons, New York (1985) pp. 476–478 and 749–751, which is incorporated herein by reference thereto. The metal film conveniently is deposited at a thickness from about 2 Angstroms to about 3,000 Angstroms. Preferably, the thickness ranges from about 10 Angstroms to about 2,000 Angstroms. The thickness of the plastic sheet is not sharply critical to the invention, and may vary over a wide range. However, lower metal particle concentrations may be used in conjunction with thicker plastics to achieve substantially equivalent glazing transmission values.

The "metalized" plastic thereafter is heated to a temperature greater than the plastic set temperature. By the term "plastic set temperature" as it is used herein is meant the temperature below which an applied stress will not cause permanent deformation to the plastic, and above which the plastic is capable of being deformed. Above the plastic set temperature, the plastic may be deformed and kneaded together by mechanical agitation. It will, of course, be appreciated by those ordinarily skilled in the art that the deformation and kneading of the plastic may be accomplished with less mechanical effort as the temperature of the plastic approaches its melt temperature.

After the metallized plastic is heated above its plastic set temperature, the plastic is deformed by conventional mechanical means such as, for example, extrusion or mechanically stirring within a vessel. This causes the metal film to disintegrate; to break apart into metal particles. The size and number of particles produced depends, inter alia, upon the thickness and composition of the metal film, the adhesion of the metal film to the plastic, and the severity of the deformation process. The operable and preferred ranges of metal particle sizes produced according to the present process are set forth hereinabove. The heated plastic and metal particles are thereafter continuously mixed together, to form a matrix of the plastic and a homogeneous dispersion of a plurality of the metal particles therein. This resultant composite material may then be cast, rolled, extruded, or otherwise formed into sheet stock suitable for use in automotive or architectural glazings.

Alternatively, before the metallized plastic is heated, it may be comminuted to prepare metallized plastic chips. The chips may then be heated above the plastic set temperature, deformed, and mixed as set forth hereinabove. As will be obvious to one ordinarily skilled in the art, chips made from different plastics having different metal films thereon may be blended together before being heated, deformed, and mixed. In this manner, composites having unique mechanical and solar control properties may be formulated. For example, this technique could be used to prepare a polycarbonate/polyester blend matrix containing a plurality of homogeneously dispersed gold and copper particles.

From the foregoing description, one ordinarily skilled in the art can easily ascertain the essential characteristics of this invention, and without departing from its spirit and scope, can make various changes and modifications in the invention to adapt it to various usages and conditions.

What is claimed is:

1. A process for preparing a composite, comprising the steps of:
   A) depositing a metal film on a surface of a plastic sheet;
   B) heating the plastic and metal film thereon to a temperature above the plastic set temperature; and C) deforming the plastic to cause the metal film to disintegrate into metal particles and mixing the plastic and metal particles, to form a plastic matrix having a plurality of the metal particles homogeneously dispersed therein.

2. The process for preparing a composite according to claim 1, wherein the metal film is deposited to a thickness from about 2 Angstroms to about 3,000 Angstroms.

3. The process for preparing a composite according to claim 2, wherein the metal film is deposited to a thickness from about 10 Angstroms to about 2,000 Angstroms.

4. The process for preparing a composite according to claim 1, wherein deformation of the plastic causes the formation of metal particles having an average mean particle size from about 2 Angstroms to about 2,000 Angstroms.

5. The process for preparing a composite according to claim 4, wherein deformation of the plastic causes the formation of metal particles having an average mean particle size from about 5 Angstroms to about 1,000 Angstroms.

6. The process for preparing a composite according to claim 1, wherein, before step B, the plastic is comminuted to prepare metalized plastic chips.

7. A process for preparing a solar control glazing material for automotive or architectural use, which reflects infrared energy and transmits visible light, comprising the steps of:

A) depositing a metal film to a thickness from about 10 Angstroms to about 2,000 Angstroms on a surface of a plastic sheet;

B) heating the plastic and metal film thereon to a temperature above the plastic set temperature; and C) deforming the plastic to cause the metal film to disintegrate into metal particles having an average mean particle size from about 5 Angstroms to about 1,000 Angstroms, and mixing the plastic and metal particles to form a plastic matrix having a plurality of the metal particles homogeneously dispersed therein.

8. The process for preparing a solar control glazing for automotive or architectural use according to claim 7, wherein, before step B, the plastic is comminuted to prepare metalized plastic chips.

* * * * *